(12) United States Patent
Bloks et al.

(10) Patent No.: US 6,249,829 B1
(45) Date of Patent: *Jun. 19, 2001

(54) COMMUNICATION BUS SYSTEM WITH RELIABLE DETERMINATION OF COMMAND EXECUTION

(75) Inventors: Rudolf H. J. Bloks, Eindhoven (NL); Calto Wong, Sunnyvale, CA (US)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,550

(22) PCT Filed: Jan. 7, 1998

(86) PCT No.: PCT/IB98/00018

§ 371 Date: Sep. 10, 1998

§ 102(e) Date: Sep. 10, 1998

(87) PCT Pub. No.: WO98/31121

PCT Pub. Date: Jul. 16, 1998

(30) Foreign Application Priority Data

Jan. 10, 1997 (EP) .................................................. 97200076

(51) Int. Cl.⁷ ...................................................... G06F 13/36
(52) U.S. Cl. ........................... 710/113; 710/129; 709/209; 709/227; 709/228; 709/250
(58) Field of Search ..................................... 370/464, 489, 370/490; 710/107, 113, 129, 240; 709/209, 227, 228, 249–250

(56) References Cited

U.S. PATENT DOCUMENTS

| | | | | |
|---|---|---|---|---|
| 5,953,511 | * | 9/1999 | Sescila | 710/129 |
| 5,961,623 | * | 10/1999 | James | 710/113 |
| 6,088,728 | * | 7/2000 | Bellemore et al. | 709/227 |

OTHER PUBLICATIONS

"The IEEE 1394 Standard", Chapter 8, pp. 199–242.

\* cited by examiner

Primary Examiner—Robert Beausoleil
Assistant Examiner—Raymond N. Phan
(74) Attorney, Agent, or Firm—Daniel J. Piotrowski

(57) ABSTRACT

A communication bus system is disclosed. More particularly, the communication bus system includes requesting stations that can issue request packets via a bus and an execution station. The execution station receives the request packets and executes commands modifying the same aspect of a state of the execution station in response to request packets from different stations. The execution station keeps information concerning execution of commands which were last executed in response to request packets for all the different requesting stations. The requesting stations can read this information to determine whether the commands corresponding to their packets are executed, even when other requesting stations are also issuing request packets. Preferably, the execution station shows each requesting station only the information about the execution of commands executed to its own request packets.

5 Claims, 1 Drawing Sheet

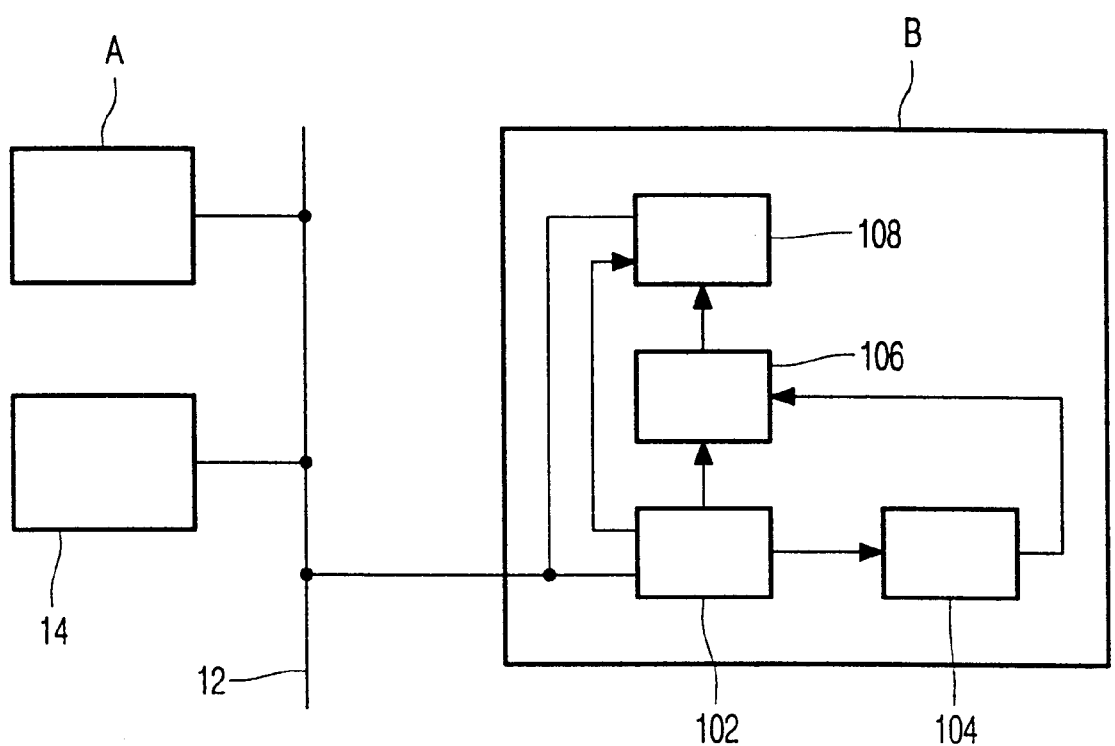

COMMUNICATION BUS SYSTEM WITH RELIABLE DETERMINATION OF COMMAND EXECUTION

BACKGROUND OF THE INVENTION

The invention relates to a communication bus system according to the precharacterizing part of claim 1.

The invention also relates to a execution station for use in such a communication bus system.

The IEEE 1394 bus system is a communication bus system (which will be referred to as a 1394 system) which can be applied to connect stations such as TV sets and videorecorders. Chapter 8 of the IEEE 1394 standard describes that an execution station has a number of control status registers (CSR's). The contents of several of those CSR's can be modified in response to request packets from all of the several requesting stations.

To prevent errors, the requesting station which sends a request packet should be able to determine reliably whether the command has actually been executed, especially if the effect of repeated execution of the command differs from that of single execution (e.g. in case of an "increase TV channel number" command or a "reserve capacity" command). When the execution station contains a status register that is affected by execution of the command and that can be read by a command from the requesting station, it is possible, in principle, to determine whether the command has been executed by verifying the contents of the status register. However, verifying the contents of the status register to detect execution does not work reliably when the bus system contains more than one requesting station that can send a request packet with a command that affects the same status register.

In 1394, the execution station after execution of a command returns a response packet to the requesting station which issued the request packet in response to which the command was executed. This allows the requesting station to determine whether the command has been executed, but it does not work when the requesting station fails to receive the response packet.

SUMMARY OF THE INVENTION

It is an object of the invention to provide for a more reliable way of determining whether the command has actually been executed.

According to the invention, in the communication bus system according to the invention is characterized by the charactering part of claim 1. By reading command execution information each particular requesting station can verify whether a command requested by it has been executed. Later execution of commands requested by other requesting stations does not affect the command execution information for the particular requesting station and therefore does not affect the reliability of verification.

The communication bus system according to the invention has an embodiment as described in claim 6. In this embodiment a particular requesting station can issue several request packets requesting execution of different types of command and verify whether the corresponding commands have been executed after all the request packets have been issued. This means that the request packets can be issued rapidly one after the other as a coherent operation, without interruption for verification. In a 1394 system, each type of command for example affects a different CSR, and the communication bus system keeps information for each particular requesting station about the last executed modification of each of the CSR's that that particular requesting station has requested.

Several forms of command execution information may be stored. If the requesting station includes a respective packet identification in each packet, then the stored command execution information may contain that packet identification. This makes it possible to check on the execution of any command at any time. The stored command execution information may contain information about the status of the execution station immediately after execution of the command or of results produced by the execution. This makes it possible for the requesting station to analyze the execution of the command in any desired amount of detail, for example in more detail than in a standard response from the execution station. Any such command execution information may be kept stored for all of the request packets received by the execution station, or for a predetermined number of request packets for which the commands have been most recently executed. Thus older commands can also be analyzed.

The command execution information may be stored in several ways. A respective predetermined storage area may be allocated in the execution station for each requesting station. When a command is executed in response to a request packet from a particular requesting station, the executing station may use the command execution information for that execution to overwrite command execution information stored in the storage area allocated to that particular requesting station. Thus, the storage area always contains the command execution information for the most recently executed command for that particular station (or initiation information, stored by the execution station before receiving any request packet). The storage area allowed to each particular station, may be subdivided into storage subareas for different types of commands, the execution station overwriting only the storage subarea for the command being executed.

In a preferred embodiment only one logical bit per command type is stored for each requesting station respectively. When the execution station has successfully executed a command in response to a request packet received from a particular requesting station, the execution station sets the logical bit for that particular requesting station (and for the type of command, if more than one type of command is recorded). In this case the executing station must also be capable of resetting the logical bit, preferably in response to a signal from the particular requesting station. In the 1394 system this signal may for example be generated when the particular requesting station reads out the CSR whose modification is recorded by the logical bit.

Readout of the command execution information is preferably triggered by a readout packet transmitted by the requesting station to the execution station via the bus interconnection. In response to this readout packet, the execution station determines from which requesting station the readout packet is issued, reads out the command execution information stored for that requesting station and sends a status packet derived under control of that command control information to the requesting station via the interconnection bus.

Preferably the memorization of command execution information is combined with the transmission of response packets by the execution unit. This gives the requesting station the option to check on critical execution of commands if no response packet is received.

BRIEF DESCRIPTION OF THE DRAWING

These and other advantageous aspects of the invention will be described in a non-limiting way using a single FIG. 1, which shows a communication bus system according to the invention

DETAILED DESCRIPTION OF THE PREFERRED EMBODIMENTS

FIG. 1 shows a communication bus system according to the invention. The communication bus system contains an execution station B, requesting stations A, 14 and an interconnecting bus 12. The execution station B contains a packet reception/interpreter unit 102, a command execution unit 104, a command execution information memory 106 and a packet generation/sending unit 108.

The communication bus system uses for example the protocol specified in the IEEE 1394 standard. The IEEE-1394 High Speed Serial Bus uses a transaction mechanism that allows any device (station) A, B, 14 on the bus 12 to read, write or perform atomic read-modify-write actions to any accessible memory location or control and status register (CSR) in any other station A,B, 14. There is no distinction between CSRs and memory in 1394 since CSRs are memory map.

To let station A perform a transaction to station B, the typical sequence is that station A sends a request packet to station B, B sends back a receipt acknowledge, then executes the requested function (takes time), then sends a response packet containing the function result or some status about the execution, after which A send a receipt acknowledge for the response packet back to B.

The request and response packets contain identifications of the sender (A in the request, B in the response), the destined receiver (B in the request, A in the response), a sequence number for this transaction from A to B and data (function, results, status, etc.). These packets are also protected by a CRC error detection code, allowing the receiver to detect packet corruption.

The acknowledge packets do not contain any of the above labels, just the status information and a very simple error detection code.

A problem was discovered with transactions that modify CSRs if the packets (request/response/acknowledge) can become corrupted or get lost on the bus for whatever reason. This problem leads to inconsistency in the information about the state of the CSR (and its side effects) for the requester (A) and responder (B).

EXAMPLE 1

Station B maintains a global bus resource indicating available bandwidth for isochronous data transmissions. Station A wishes to allocate some of this bandwidth, and sends a request packet to B containing a so called compare-swap lock function, which attempts to reduce the amount of available bandwidth by the requested amount. A response packet that B sends back to A indicates if the allocation was successful and hence whether or not A now owns the bandwidth and may use it. Suppose the request arrives without errors at B and is executed and succeeds bandwidth gets allocated for A). The response packet is sent back to A, but never receives it, even after possible retransmissions by B. A does not know if it has been granted bandwidth and will never deallocate it: the requested amount is simply no longer available for isochronous data.

EXAMPLE 2

Station B is a TV device that implements a CSR which, when written to, selects the next channel. If A sends a write transaction to B to switch to the next channel, but never finds out if the command was actually executed then it could decide to retry the command, assuming something went wrong. It is possible that the TV station B has executed a 'channel up' function twice and is now showing the wrong channel.

Transactions that do not modify a CSR and that do not have any other side effects do not suffer from this problem, since these can safely be retried if the requester suspects that something was wrong. Transactions that do modify CSRs and/or have side effects can lead to undesirable results for single devices (example 2) or even malfunctions of the entire bus (example 1).

The problem is caused mainly by the fact that the only way for a requester to find out the results of its request is by receiving the response. If the response is lost then there is no way to retrieve the information later from the responding station. Reading the CSR that was supposed to be modified is not a solution because other stations may have modified it in the mean time, or reading it may have side effects that are not desirable.

As a result of errors on the network the following 'states' exist after the transaction:

S1: transaction has been executed and the requester knows it.

S2: transaction has not been executed and the requester knows it.

S3: transaction has been executed but requester does not know.

S4: transaction has not been executed but requester does not know.

The term "executed" here means that the function corresponding to the transaction was executed, regardless of whether this resulted in a modification of the CSR value.

For the requester S3 and S4 are not distinguishable: it simply does not know if the request was executed. These are the problem cases if the transaction was of a type that could have lead to a change in the CSR value or if it had any other side effects. S1 and S2 can be handled directly by the requester and do not form a problem.

The solution to this problem is the following concept:

Any execution station that implements a CSR which need to be protected from the above problem preferably stores the result or status of transactions which were received and executed (whether successfully or not) from any external station so that they may be retrieved later by that station. For this purpose the execution station 10 contains a command execution information memory 106. In operation, the packet reception/interpreter unit 102 receives packets from the bus 12 and interprets them as follows. First the packet reception/execution unit 102 determines whether the packet specifies the execution station 10 as destined receiver. If so, the packet reception/execution unit 102 extracts information from the packet which determines which command should be executed and issues this information to the command execution unit 104, which executes the command. A result of execution is output to the command execution information memory 106 and stored therein when the packet reception/execution unit 102 signals that the command has been executed.

The execution station 10 preferably defines an Error Status Register (ESR) in its CSR space that can be accessed with a read request transaction by any requesting station and accesses information in the command execution information memory 106. Thus such a station can read the status of (one of) its previously requested transactions. Reading the ESR itself has no side effects. The status of the requesting station can be cleared by having the requesting station write to the ESR (regardless of data written) using a write request transaction. A requesting station can only clear status information about its own transaction(s) using this mechanism.

In the 1394 system the fact that each request contains the identifier of the requesting station allows a responder to (and executer of) such a transaction to record the status information together with a label that uniquely identifies the transaction (i.e. the address label of the requester station and the transaction sequence number). This information may also be returned in the response packet.

The distinction between states S3 and S4 mentioned before is available at the responding station and remembered there for later retrieval by the requester in case it ends up in one of these states.

Since all stations on the bus can independently issue transactions to a single CSR in one particular station, that station must remember the status of transactions for each station. If a station later reads the ESR it will get only the status for its own transactions, not of those requested by other stations.

Embodiments

A. Storage of status (how much to store)

A1. In the most general implementation, the station remembers all uniquely identifiable transactions of all stations. In IEEE 1394 a station address is 16 bits and the transaction sequence number is 6 bits. This leads to a worst case situation where $2^{22}$ status values have to be stored.

A2. It is not necessary to actually implement such a storage facility. Only data for actual transactions needs to be stored which is expected to be far less (indication: up to a few thousand for very high end implementations).

A3. A simpler storage method is to just store the status of the LAST transaction executed per station and to support this only for stations on the local bus, not for other stations connected through bridges. This reduces the storage requirements to not more than 62 locations.

B. Representation of status (what to store)

B1. The most general implementation would store the entire result status of a transaction, i.e. if the original request packet was received then information about the subsequent events is available: executed or not, why not executed, errors in delivering a response packet, etc. For IEEE 1394 it would suffice to record the original response code that was intended to be delivered in a response packet to the requester, together with any extra information essential for the requester to make a decision: e.g. CSR modified in a lock transaction (not shown in response code), or side effect of request on CSR executed.

B2. A simpler implementation can suffice by recording only the information about the conceptual state of the responder when it starts to return a response packet (S3 or S4, as indicated earlier), and nothing else. This costs only 1 bit of memory per transaction. Especially in combination with option A3 the storage requirements are minimal. However, since the original label that uniquely identifies the transaction is not remembered, it is not clear if the currently remembered status for a station X belongs to the last transmitted request packet of station X (if that packet is lost then the status will still reflect the result of the previously received request from station X). For this implementation the error status must be cleared to a safe value (corresponding to conceptual state S4) before attempting the unsafe new transaction (only if it is not already in that state). A way to do this with minimal overhead is to define that any transaction without side effects on the protected CSR leads to a change of the recorded status to S4, which would be interpreted as "no side effect resulted from last received transaction". In IEEE 1394 a read transaction would typically not have side effects. At the same time it is the standard way of obtaining one of the date values needed for a compare-swap lock transaction. That is what makes this mechanism very suitable for implementation in IEEE 1394 to protect this kind of CSR.

C. Accessing the status (how to make it available)

Implementations for making the status available can take any form but will have to be standardised (the method of accessing, the format by which the information is returned and possibly the station offset address associated with each ESR).

C1. The most universal solution is where any station can retrieve the transaction status of any station (itself and others) using read transactions (without side effects) on a specially introduced new status register called the Error Status Register (ESR) which itself is a CSR as defined in the IEEE 1212 and IEEE 1394 architecture. Data in the read transaction must be used to index in the storage to access to desired status. This is not easily implementable with current 1394 transactions.

C2. Since C1 is needlessly complex it is better to explore solutions where any station can only access the results of its own transactions. By performing a read transaction on the ESR the responder can use the station address of the sender (requester) in the transaction packet to select the proper status value and retun it as a read response.

Information return which transaction from the past the status should be returned for cannot be included in the read transaction packet unless the ESR occupies a range of addresses, and the address is used as an index. This is not desirable since there could be many ESRs, each protecting just one other CSR (address). An option is to return status for all (up to 63) previous transactions and let the requester select the proper one.

C3. Further simplification is possible in combination with A3. If only the status of the last transaction is stored the problem mentioned in C2 is avoided and a single address ESR is sufficient. Packet sizes and overhead will be minimal in this case.

C4. In combination with B2 and A3 a very simple implementation would be to implement the ESR as a 63 bit register where bit k represents the status of the last transaction performed by local station k. A logic 0 could be used to indicate "no side effect/not executed" and a logic 1 to indicate "CSR modified/side effect". This is the simplest and probably most likely-to-be selected candidate for implementation.

What is claimed is:

1. A communication bus system comprising:

a bus;

a plurality of requesting stations coupled to the bus, each requesting station capable of issuing a respective request packet via the bus; and an execution station coupled to the bus for receiving the respective request packets, the execution station keeping execution information relating to the respective request packets, the requesting stations being able to read from said execution information;

wherein the execution station simultaneously stores execution information for at least two different requesting stations concerning execution of respective commands which were last executed in response to respective request packets from the two different requesting stations respectively; and wherein the information concerning execution of the respective commands contains a bit of information for each one of said at least two different requesting stations respectively, the execution station setting a bit when a command is successfully executed in response to a request packet from a corresponding requesting station.

2. A communication bus system comprising:

a bus;

a plurality of requesting stations coupled to the bus, each requesting station capable of issuing a respective request packet via the bus; and an execution station coupled to the bus for receiving the respective request packets, the execution station keeping execution information relating to the respective request packets, the requesting stations being able to read from said execution information;

wherein the execution station simultaneously stores execution information for at least two different requesting stations concerning execution of respective commands which were last executed in response to respective request packets from the two different requesting stations respectively;

wherein the information concerning execution of the respective commands contains a bit of information for each one of said at least two different requesting stations respectively, the execution station setting a bit when a command is successfully executed in response to a request packet from a corresponding requesting station; and wherein said commands modifies a content of a register, a bit of information being reset when said content is read by a corresponding requesting station.

3. An execution station for connection to a bus, the execution station being arranged for receiving respective request packets from different requesting stations via the bus, the execution station executing a respective command upon reception of each of the respective request packets, the respective commands modifying a common aspect of a state of the execution station, the execution station keeping information concerning the common aspect, the requesting stations being able to read from said information concerning the common aspect;

wherein the information concerning the common aspect simultaneously contains information for at least two different ones of the requesting stations concerning execution of respective commands which were last executed in response to respective request packets from the two different ones of the requesting stations respectively; and wherein the information concerning execution of the respective commands contains a bit of information for each one of said at least two different ones of the requesting stations respectively, the execution station setting the bit when a command is successfully executed in response to a request packet from the corresponding requesting station.

4. An execution station for connection to a bus, the execution station being arranged for receiving respective request packets from different requesting stations via the bus, the execution station keeping execution information relating to the respective request packet, the requesting stations being able to read from the execution information;

wherein the execution information contains a bit of information for each one of at least two different requesting stations respectively, which were last executed in response to respective request packets from the two different requesting stations respectively, the execution station setting a bit when a command is successfully executed in response to a request packet from a corresponding requesting station.

5. The execution station according to claim 4, further including a status resister to store the execution information.

* * * * *